Feb. 26, 1963  A. N. GRAY  3,078,514
METHODS OF AND APPARATUS FOR EXTRUDING
THERMOPLASTIC COMPOUNDS
Filed March 2, 1961  3 Sheets-Sheet 1

INVENTOR.
A. N. GRAY
BY
ATTORNEY

United States Patent Office 3,078,514
Patented Feb. 26, 1963

3,078,514
METHODS OF AND APPARATUS FOR EXTRUDING THERMOPLASTIC COMPOUNDS
Alvin N. Gray, Pass-a-Grille, Fla., assignor to Western Electric Company Incorporated, New York, N.Y., a corporation of New York
Filed Mar. 2, 1961, Ser. No. 93,269
10 Claims. (Cl. 18—13)

This invention relates to methods of and apparatus for extruding thermoplastic compounds autogenously, and more particularly, although not exclusively, to methods of and apparatus for extruding thermoplastic compounds autogenously as an insulating sheath of a predetermined size and shape on a continuously advancing core.

This application is a continuation-in-part of application of copending application, Serial No. 544,413, filed November 2, 1955 (now abandoned).

The art of extruding rubber originated in approximately 1880. At that time, hot rubber material was introduced into the entrance end of a conveyor screw which forced the rubber material through an extrusion die without intentionally working the material being advanced by the screw. However, it was found that there was some working of the rubber material by the screw which resulted in an interchange of the mechanical energy from the conveyor screw to the rubber material being advanced by the screw in the form of heat generation. It was then found necessary to remove excessive heat from the extruder and the rubber material to prevent partial vulcanization of the material before it passed through the die of the extruder.

In the past it was necessary to utilize types of equipment similar to those disclosed in Gordon Patent 1,608,-980, De Laubarede Patent 2,631,016 and Elgin et al. Patent 2,653,915 for conditioning the material prior to the introduction of the material into extrusion apparatus or for reclaiming rubber products. However, the types of equipment disclosed in these patents were used to perform a preliminary treatment of the solid material prior to the possible extrusion of the material about a conductive core by some other type of apparatus and should not be confused with ordinary extrusion apparatus of the type embodied in the present invention.

In approximately 1947, a novel screw was designed and developed for rubber extruders. The new screw was provided with a reduced clearance between the wall of the cylinder and the root of the screw. A screw of this type is disclosed in United States Letters Patent 2,547,000 to A. N. Gray. This type of screw made it possible to introduce cold rubber material into the entrance end of the extruder and utilize the screw to work and condition as well as advance the rubber material. However, this type of screw required external cooling, since the working of the rubber material, resulting in the generation of a relatively large amount of heat, would otherwise result in vulcanization of the rubber material within the extruder if cooling media were not utilized to maintain the temperature of the rubber material below predetermined limits.

With the advent of the commercial use of thermoplastic compounds, sometime between the years 1930 and 1935, extruders were introduced for such plastics. Some of the first of such extruders introduced the material cold into the screw; however, it was found that, in order to obtain the proper consistency of the plastic at the extruding die, it was necessary to add heat. In order to add heat to the extruder to compensate for the cold material being introduced therein, steam was first used in jackets surrounding the extruder barrel. Sometimes in combination with the steam jackets, hot water or oil was passed through the screw. However, even with this additional heating it was found that the plastic was in the extruder barrel for too short a time to permit all of the material to be fluxed, and, therefore, satisfactory products were not obtained. Also, part of the material remaining in the root of the screw during its passage through the extruder remained unfluxed, which was undesirable and could not be tolerated.

Backing plates and screens were placed within the extruders to catch unfluxed plastic, to prevent the unfluxed plastic from being extruded and to hold the unfluxed plastic against the screen to permit the warm fluxed plastic passing thereby to heat the unfluxed plastic to the proper temperature to flux it.

In the late 1930's extruders were built wherein the barrel and the screw were lengthened in order to permit the plastic to be within the heated extruder for a longer period of time. The extruders were provided with shallower screw threads for preventing plastic from remaining in the deep portion of the flight of the screw during its passage through the extrusion cylinder and thus remaining unfluxed. In approximately 1945 or 1946, about 2,000 commercial extruders for plastics were available in the United States, utilizing the screw design mentioned above and utilizing hot oil for heating purposes. In these extruders, the heat imparted by the hot oil was controlled externally by the machine operator.

After World War II, many of the plastics extruders were heated electrically. With the use of electric heating for such extruders, it was found that the points adjacent to the electric heating coils were heated rapidly and to high temperatures. This resulted in hot spots in the plastic, which are damaging to the plastic and particularly one of the popular thermoplastic materials, polyvinyl chloride. Accordingly, in order to overcome the detrimental high temperatures that resulted in the above extruders, systems of cooling were introduced to take out the excess heat which, among others, included fans, sprays and circulating water tubes.

With this advent, wherein both heating and cooling means were utilized for selectively adding heat to or removing heat from the interior of the extrusion cylinder during an extrusion operation to control the temperature of the thermoplastic material, it became necessary to provide elaborate and relatively costly heat control systems. These heat control systems were provided on such extruders and were based on the mistaken assumption that only by the use of such systems could accurate temperature and extrusion control be accomplished. The extruders having the elaborate heat control systems are relatively high in initial cost and an exceedingly high amount of maintenance is required on such extruders.

Usually heat transfer media, such as oil and water, were circulated through heat exchange conduits provided in both the stock screw and the wall of the extrusion cylinder. An example of an extrusion system employing supplemental, external heating and cooling equipment is disclosed in G. E. Henning Patent 2,688,770. The temperature and the flow rate of the fluid heat transfer medium usually is regulated by conventional heat-responsive control means to maintain arbitrarily selected average temperatures within the extrusion cylinder.

When external heating and cooling are employed to regulate the temperature of a thermoplastic compound within the extrusion cylinder, it is unavoidable that those layers of the compound which are in direct contact with the heated or cooled surfaces of the stock screw and the extrusion cylinder are most severely and rapidly affected by changes in the temperature of the latter. Other portions of the thermoplastic compound more remote from the surfaces of the stock screw and the extrusion cylinder are affected to a lesser degree or more slowly.

During a normal operating run with an extruder employing external heating and cooling, the stock screw and the extrusion cylinder are alternately heated and cooled to maintain a predetermined, empirically established, average temperature condition in the thermoplastic compound within the extrusion cylinder. As mentioned previously, this temperature control is usually obtained automatically by suitable control equipment well known in the art.

Assuming that at a given moment the temperature control equipment senses a rise in the temperature of the thermoplastic compound above an arbitrarily selected control point, the cooling equipment will be actuated automatically to circulate the heat transfer medium, at a relatively lower temperature, through the heat exchange conduits to remove heat from the thermoplastic compound within the extrusion cylinder via the stock screw and the walls of the extrusion cylinder. When the stock screw and the walls of the extrusion cylinder are cooled in the process, the layers of the thermoplastic compound immediately adjacent to these relatively colder surfaces are chilled more than other portions of the compound. Thereafter, when the need for heat is sensed by the automatic temperature control equipment, the layers of the thermoplastic compound in direct contact with the relatively hot surfaces of the stock screw and the extrusion cylinder are heated to much higher temperatures than other portions of the compound.

In order for the screw to exert a forward push on the material and advance the material along the helical channel formed by the thread on the stock screw and through an extrusion cylinder, it is necessary to have frictional resistance between the material and the surface of the stock screw and the stationary barrel. Without this friction, the material would not move. Therefore, the immediate effect of the heat being introduced into the machine by the external heaters around the barrel and in the screw is to elevate the temperature of the barrel and screw and to soften the thin layer of plastic immediately adjacent to the barrel and screw. Obviously, there is a resulting change in the consistency of the material immediately adjacent to the barrel and screw and the frictional resistance therebetween decreases which results in a disproportionate mobility of the boundary layers of the compound. This causes a marked decrease in the constancy of the volumetric rate of flow of the plastic in the extruder and, therefore, causes the size of the extruded product to increase.

Conversely, when the added heat raises the temperature of the plastic above the arbitrarily selected control level, after an inherent time lag, a temparature sensing device indicates that cooling is needed. Then the controls operate and cooling commences, which temperature-wise does exactly the reverse of heating. Actually, as far as the plastic is concerned, the cooling simply serves to change the consistency of the material immediately adjacent to the inner surface of the barrel and the external surface of the screw in the opposite direction. This, in turn, increases the frictional resistance therebetween and disturbs the uniformity of the flow of the plastic material along the flight of the screw by increasing the volumetric rate thereof.

This alternating heating and cooling goes on indefinitely and the effects are invariably reflected in relatively sudden alternate variations in the output rates of the extruder which result in the size of the extruded product varying from one extreme to the other. For example, if the extruded product is an insulating covering on a filamentary conductor being passed through the extruder at a uniform speed, alternate increases and decreases in the extrusion output rate result in corresponding changes in the thickness of the insulating covering. Since most products of this type must have a certain minimum dielectric strength and insulation resistance, a corresponding larger amount of material must be used, to render the minimum diameter of the insulation sufficient, then would be required if closer control on the diameter of the insulation could be obtained. Accordingly, all the material making up the larger than needed diameter is wasted.

Further, in the manufacture of communications cables containing a multiplicity of pairs of individually insulated conductors, it is important that differences in the capacitance to ground of the two insulated conductors of a pair be suppressed and that both possess substantially equal capacitance with respect to the surrounding pairs of the cable and the metallic sheath.

In manufacturing such cables, it has been the practice to attempt to maintain the capacitance to ground of such insulated conductors within tolerable limits by controlling the outside diameter of the sheath of plastic insulation as it is extruded upon the conductor. Accordingly, it is of utmost importance that capacitance controls be utilized in the manufacture of insulated multipaired cables. Any difference in the thickness of the insulation between spaced conductors in a transmission cable, in which the insulated conductor is later employed, will cause an unbalance capacitance condition to exist thus causing crosstalk to occur in the transmission circuits. It is, therefore, obvious that nonuniformity of insulation on conductors is harmful in telephone systems because they introduce instabilities in the transmission characteristics of the circuits and prevent achievement of the desired aims of the industry.

This can be demonstrated by the following well known formula for the coaxial capacitance between conductors and conductive material surrounding the insulation thereon.

$$C = \frac{K\epsilon}{\log \frac{DOD}{D}}$$

where $\epsilon$ is the dielectric constant of the insulating material, DOD is the diameter over the insulation, D is the diameter of the conductor and K is a constant. If other variants are kept constant, it is clear that more uniform electrical characteristics such as capacitance can be maintained by maintaining more uniform diameter over the insulation. Therefore, it is important that a maximum reduction in the deviation of the diameter over the insulation be realized, since, if uniformity is not present, capacitance unbalance will be introduced which will affect the transmission characteristics of such a cable and introduce crosstalk.

Another problem presented in the design of telephone cables, is the determination of the cheapest way of providing a cable circuit having the required electrical characteristics while making the most efficient use of a given amount of space within a sheath and without having to increase the diameter of the sheath and thus increase the material used in making the sheath. With conductors having insulation thereon with a more uniform outside dimension, thus preventing oversized insulated conductors, the space per pair of conductors can be reduced and thus the cost of the cable will be decreased.

In the manufacture of insulated conductors and cables for the communications industry, and particularly for telephone systems, the evolution of the extrusion art, as set forth above, has been utilized, and the difficulties set forth have been particularly noticeable. In such manufacture, it is customary to extrude an insulating covering on a single wire conductor, or on two or more individually insulated conductors.

Paralleling the development of the extrusion art, some of the first insulating material extruded were rubber compositions, which has now been supplemented greatly by thermoplastic insulating materials, such as polyethylene and polyvinyl chloride.

Likewise, in the advancing technical world, members of the general public expect improvements in the quality of telephone transmission since they take for granted naturalness of speech, freedom from extraneous noises and pleasing volume control in their telephone conversations. Also, imperfections and degradations to which the ear is tolerant are much more harmful in the transmission of data. Accordingly, rigid specifications have been established by the communications industry requiring visual, physical, mechanical and electrical characteristics at all points along a multiconductor insulated wire or cable to be uniform within narrow limits of tolerances.

It is the aim of most manufacturers of communications products to manufacture products in accordance with these specifications which will enable their customers to provide the highest possible quality of communications service, which is limited of course by technical and economical considerations, and to approach transmission qualities equivalent to those of face-to-face conversation. It is also the aim of such manufacturers to design equipment which will permit them to manufacture articles that meet the above-mentioned required electrical, mechanical and visual characteristics and yet improve the quality of the product produced and decrease the cost thereof.

If conventional nonautogenous extruders having auxiliary heating and cooling means thereon are used for the extrusion of insulation on conductors, an alternating increase and decrease in the extrusion output rate occurs which results in a corresponding change in the thickness of the insulated covering. When the insulated conductors having differences in the thickness of the insulation thereon are used in a transmission cable, an unbalance capacitance condition exists thus causing crosstalk to occur in the transmission circuit. It is, therefore, obvious that nonuniformity of insulation on conductors is harmful in telephone systems because they introduce instabilities in the transmission characteristics of the circuits, and prevent achievement of the desired aims of the industry.

Having built these deliberate errors into the nonautogenous extrusion apparatus used for extruding insulation on conductors to form insulated conductors for communications cables, expensive and complicated size-sensing devices have been utilized to overcome the effects of the heating and cooling systems. In order to overcome this problem in extruding an insulating covering on a strand, a detecting device is utilized to determine when oversized or undersized products are produced. In the event that an undersized product is detected, a change may be brought about through servo-mechanisms either to reduce the speed of the conductor or increase the speed of the screw in an attempt to compensate for the inherent errors in such extruders. Conversely, when the size-sensing device detects an oversized product, it does exactly the opposite. In this manner, an extruder is built with equipment which tends, in some instances, to give an undesirable product, and other equipment is attached thereto to alter the operation of the extruder in an attempt to correct the errors which were originally built into the extruder. This results in nonuniform and undesirable products.

If the adjustments of the extrusion apparatus are accomplished, by operating personnel instead of servo-mechanisms, personal errors may be introduced by the adjustment and control of the machine. In the manufacture of telephone cables the seriousness of undersized products are particularly pointed out to the operators but less attention is directed to oversized products, and when an operator makes adjustments he will insure that the product is safely above the minimum requirement and thus will apply an excessive amount of material over and above that which is required by the specification.

Further, it is quite obvious that no two machine attendants, regardless of their experience or level of intelligence, will operate a machine in identical manners. As a consequence, every valve, switch or control device of any sort which is subject to the attendants' adjustments is a danger point which should be eliminated. Also, in order to advance the sciences and useful arts and to provide uniformity in products, it is one of the purposes of engineers to eliminate the services attended to by an operator in a particular manufacturing process with the possible exception of the services necessary to feed the raw materials to the machine and remove the finished product therefrom.

Manifestly it is important that, when using extrusion apparatus for insulating conductors, the flow of the plastic material be as smooth and free as possible from quantitative variations in the output thereof during the extrusion process so that a product of constant size and quality is produced. Accordingly, it is desirable to eliminate entirely all external heating and cooling during the operation of an extruder, and to construct an extruder in which all of the heating for conditioning the plastic material being extruded thereby would be substantially totally dependent upon the amount of mechanical working imparted to the plastic material within the extrusion cylinder.

In this way, thermoplastic material may be placed into the extruder at room temperature and all of the necessary heat for conditioning the thermoplastic compound is generated through the expenditure of mechanical energy during the working of the thermoplastic compound being advanced through the extrusion cylinder and substantially no heat is transferred either to or from the plastic material by external means. Such conditioning of the plastic material will insure substantially uniform extrusion temperatures throughout a cross section of the helical channel of the stock screw thereby alleviating fluctuations in the output rate of the extruder and thermal degradation of the thermoplastic material, provided other conditions remain unchanged.

By utilizing novel methods and apparatus embodying certain principles of the present invention, autogenous extrusion may be accomplished whereby the extruder, performing without external aid in the form of heating or cooling during the operation thereof, will receive plastic material at room temperature, and solely by virtue of the power exerted by the drive of the screw, heat, work and condition the plastic material so that the material is in an optimum condition and is ready for extrusion when the material arrives at the exit end of the screw. Thus, novel extrusion methods and apparatus have been developed which possess natural temperature balances, are very stable and permit the output rate of the extruder to remain constant.

By utilizing these novel methods and apparatus, an unexpected result may be attained, which permits relatively cold plastic material or plastic material of varying consistencies to be fed into the extruder without upsetting the natural balance of the uniform conditioning of the material and still maintain an unexpected uniform delivery rate of extrusion upon which the novel autogenous extrusion methods and apparatus depend. This may be accomplished by driving the extrusion screw at a constant speed, under the varying load conditions, by a variable torque drive.

Under the above operation, if the screw rotates at the same rate of speed, it must do more work on the colder or stiffer material, which is more susceptible to working by the screw as the material is moved from one end of the extrusion cylinder to the other by the screw. However, the work done will be the exact amount required to bring colder plastic material to the exact condition that the rest of the material has been brought. Conversely, if the material is warmer and softer and, therefore, less susceptible to working by the screw, the screw rotating at a constant rate does less work on the softer material as the screw moves the material from one end of the extrusion screw to the other and thus brings the softer material to the same condition for extrusion as the colder and stiffer material. Therefore, with apparatus of the present invention, it does not matter whether the material is soft or stiff, the extruder will work a little more or a little less depending upon the initial condition of the material introduced into the extruder, so long as the speed of rotation of the screw is kept constant. In this manner only the necessary amount of work will be done to bring about the desired condition of the plastic and no need exists to provide elaborate heating and cooling means as were found necessary previously.

It is an object of this invention to provide new and improved methods of and apparatus for extruding plastic material autogenously.

It is another object of this invention to provide new and improved methods of and apparatus for extruding thermoplastic compounds autogenously into an insulating sheath on a conductive core passing therethrough at a substantially uniform rate.

It is a further object of the present invention to provide new and improved autogenous extrusion methods of and apparatus for forming a thermoplastic insulating sheath of a predetermined size and shape on a continuously advancing conductive core, which methods and apparatus possess a natural balance that is substantially stable and permits thermoplastic compounds to be supplied to such a process or apparatus in a solid state of variable consistencies and be worked and conditioned without upsetting the natural balance of the uniform conditioning of the material and still cause the output of the extrusion apparatus and process to remain at an unexpected substantially constant rate so that the flow of the thermoplastic compound is smooth and free from quantitative variations which reduces deviations in the size and quality of the insulated conductor produced thereby and reduces the cost thereof.

A complete understanding of the invention may be had from the following detailed description of methods and apparatus forming specific embodiments thereof, when read in conjunction with the appended drawings, in which.

Referring now to the drawings, a solid thermoplastic compound 10, such as polyethylene or the like (FIGS. 3a and 3b), is fed to an extruder, indicated generally at 11 (FIG. 1), from a feed hopper 12. The thermoplastic compound 10 may be initially in the form of granules, pellets or the like, a supply of which is maintained within the feed hopper 12. The extrusion apparatus is designed to form an insulating covering 14 (FIG. 3b) of the thermoplastic compound around a filamentary, metallic conductor or core 15 which may be initially bare, or may have a paper, textile, plastic or other type of covering thereon.

The extruder 11 includes an extrusion cylinder 20 (FIGS. 3a and 3b) having a charging opening 23 at the entrance end thereof, which connects the feed hopper 12 with a longitudinally extending cylindrical extrusion bore 25 formed in the cylinder. The bore 25 is smooth-walled and has a uniform diameter along its entire length. Mounted rotatably within the bore 25 is a stock screw 30. The stock screw 30 (FIGS. 3a and 3b) is rotated by an adjustable, constant speed, variable torque, electric motor 31 operatively connected to a drive shaft (not shown). The drive shaft, in turn, is keyed to a shank portion 34 formed integrally with the left hand end of the stock screw, as viewed in FIG. 3a. The stock screw is designed to work the thermoplastic compound 10 and force the thermoplastic compound 10 through the bore 25, a strainer 36 positioned transversely across the discharge end of the bore, and into an extrusion head, indicated generally at 40. The extrusion head 40 is secured detachably to the discharge end of the extrusion cylinder 20, and includes a tool holder 44 having a tapered port 45, which forms a continuation of the extrusion bore 25. The tapered port 45 communicates with an extrusion passage 50 formed in the tool holder 44 transversely with respect to the tapered port. An extrusion die 53 is mounted at the exit end of the passage 50.

Figure 1:
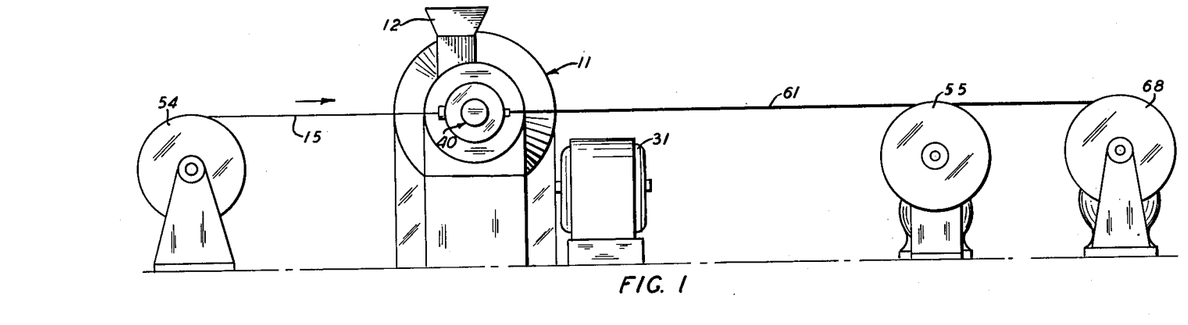
FIG. 1 is a front elevation of an apparatus forming one embodiment of the invention.
Figure 2:
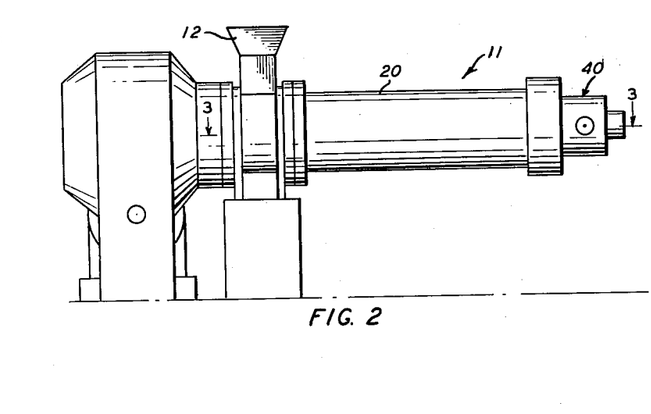
FIG. 2 is a side elevation of an extruder forming part of the apparatus shown in FIG. 1, as viewed from the left hand side in FIG. 1.

The conductor 15 is advanced continuously from left to right, as viewed in FIG. 1, from a supply reel 54 at a predetermined constant rate by means of a conventional capstan 55. The conductor 15 passes through a core tube holder 57 and a core tube 60. The core tube 60 guides the conductor 15 through the axial center of the die 53, wherein the conductor is enveloped by the covering 14 of the thermoplastic compound to form an insulated conductor 61. The finished insulated conductor 61 is taken up on a takeup reel 63.

The stock screw 30 comprises a root 70 about which a single, helical flight 72 is formed. The helical flight 72 has a constant external diameter along the entire length of the stock screw, which diameter is substantially equal to the diameter of the extrusion bore 25, except for the usual running clearance which must be provided between the parts. The helix angle of the flight 72 measured as the angle between the flight and a plane perpendicular to the longitudinal axis of the stock screw 30 is constant along the entire length of the stock screw.

The flight 72 is generally rectangular in cross section, and is relatively small in width in comparison to its pitch. In effect, the flight 72 forms two sides of a channel 75, which is bounded on the bottom by the root 70 and on the top by the wall of the extrusion bore 25. The depth of the channel 75 is not constant along the length of the stock screw due to predetermined variations in the diameter of the root 70. A cylindrical conditioning tip 80 is threadedly attached to the delivery end of the stock screw 30 for rotation therewith. Preferably the conditioning tip 80 is unthreaded.

Figure 3:
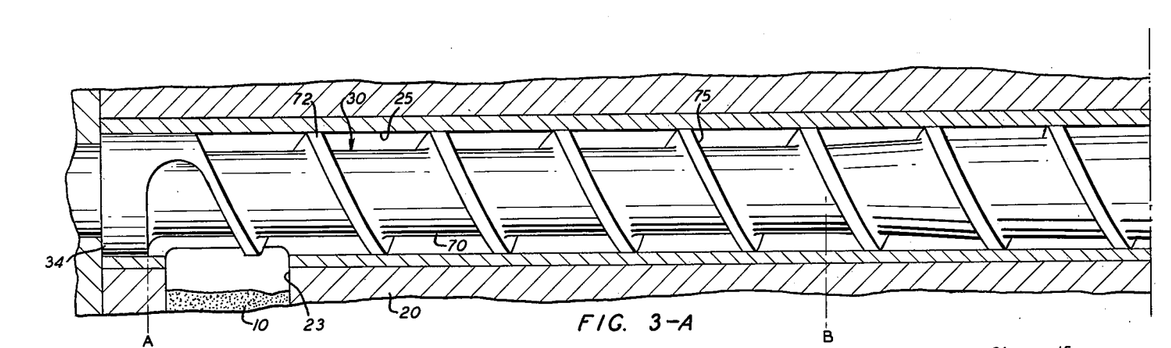
FIGS. 3a and 3b combined constitute an enlarged, fragmentary, horizontal section taken along line 3—3 of FIG. 2, with parts thereof broken away.
Figure 4:
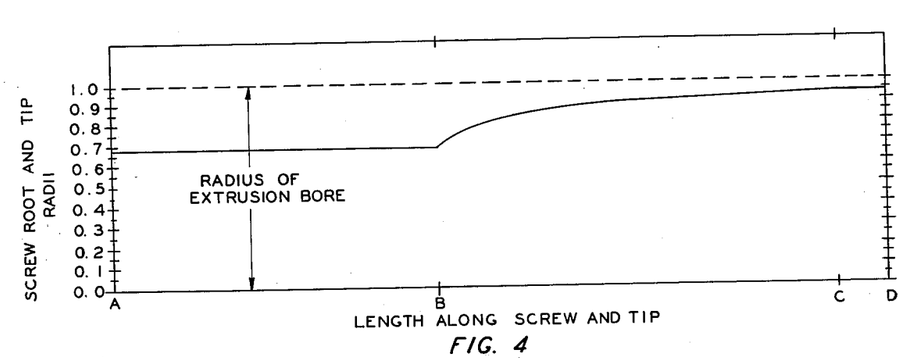
FIG. 4 is a diagram illustrating graphically the variation in the root radii along the longitudinal axes of a stock screw and a conditioning tip forming parts of the apparatus.

To facilitate a detailed description of the aforementioned variations in the outer diameter of the root 70 of the stock screw 30, the latter, excluding the shank portion 34, has been divided lengthwise into two sections, as indicated in FIGS. 3a, 3b and 4. Referring now to FIGS. 3a and 3b, the stock screw 30 is provided with a conveying section A—B lying at the left hand end thereof and extending rightwardly from a designated point "A" on the longitudinal axis of the stock screw to a point "B" likewise on the longitudinal axis. At its right hand end the conveying section A—B joins a working section B—C extending longitudinally from point B to a point designated "C" on the longitudinal axis of the stock screw 30. The point C is located at the right hand extremity of the stock screw 30 on the parting line between the stock screw and the attached conditioning tip 80. For the purpose of this description, the conditioning tip 80 extends from the point C to a point designated "D."

The conveying section A—B of the stock screw 30 is designed to pick up the granules of the plastic compound supplied from the feed hopper 12 through the charging opening 23 and to convey the granules in a steadily compacting mass as they move to the working section B—C. The diameter of the root 70 along the conveying section A—B is made the minimum allowable, consonant with structural strength requirements of the stock screw. As a result, the depth of the helical channel 75 along the conveying section A—B is relatively large.

In this particular embodiment of the invention, the depth of the channel 75 along the working section B—C is a hyperbolic function of the length along the longitudinal axis of the stock screw 30 and decreases hyperbolically from point B to point C. The hyperbolic variation in the depth of the channel 75 along the working section B—C is by design such as to impart a substantially constant acceleration to the thermoplastic compound 10 as it is impelled along this section of the channel. The desired relationship between the depth of the channel 75 and a distance (X) measured along the longitudinal axis, with the point B as an origin, may be expressed as follows:

$$h_x = \frac{1}{\left[\dfrac{\dfrac{1}{h_c} - \dfrac{1}{h_b}}{l_{bc}}\right] X + \dfrac{1}{h_b}}$$

where:
$h_x$=the depth of the channel 75 at a point
$h_b$=the depth of the channel 75 at the point B
$h_c$=the depth of the channel 75 at the point C
$l_{bc}$=the length of the constant acceleration section The above expression is derived and explained fully in copending application Serial No. 483,664, filed January 24, 1955, by R. D. Gambrill and A. N. Gray, now United States Patent 2,872,703.

The conditioning tip 80 has a constant outer diameter equal to the maximum diameter of the root 70 of the stock screw 30 at the point C and is relatively short. The conditioning tip 80 has a length ($l_{cd}$) which is very small in comparison to the length ($l_{bc}$) of the working section B—C of the stock screw. The depth of the annular passage 81 between the periphery of the conditioning tip 80 and the wall of the extrusion bore, which depth is equal to $h_c$, is by design very small, and is such that the conditioning tip causes the plastic material to be worked very severely along its length ($l_{cd}$).

For a particular thermoplastic compound 10, the length ($l_{cd}$) and the depth $h_c$ are by design such as to cause the compound reaching the point D to be in the optimum condition required for smooth and uniform extrusion of the compound. As soon as the optimum extrusion condition is obtained, substantially no further work is expended upon the thermoplastic compound 10 and the compound is immediately discharged into the port 45 in the extrusion head 40. It will be understood that in determining the length ($l_{cd}$) of the conditioning tip 80 and the depth $h_c$, the ruling factor is the conditioning of the thermoplastic compound. If an increase in the volumetric output rate is desired, resort should be had to a larger bore extrusion cylinder.

Since the thermoplastic compound 10 is worked very severely by the conditioning tip 80 and the rise in its temperature is extremely rapid, the thermoplastic compound leaving the working section B—C of the stock screw 30 at the point C must be at a temperature substantially lower than the desired optimum temperature of the thermoplastic compound at the point D. Accordingly, the length ($l_{bc}$) of the working section B—C of the stock screw 30 is calculated to cause the thermoplastic compound reaching the annular channel between the periphery of the conditioning tip 80 and the wall of the extrusion bore 25 to be at this substantially lower temperature.

For a given extrusion cylinder having an extrusion bore of a predetermined length, the length ($l_{ab}$) of the conveying section A—B is established by the lengths ($l_{bc}$) and ($l_{cd}$) of the working section B—C and the conditioning tip 80, respectively. The length ($l_{ab}$) of the conveying section A—B is merely the length of the portion of the extrusion cylinder extending between the charging opening 23 and the end of the conditioning tip 80 minus the sum of the lengths of the working section B—C and the conditioning tip, whatever that difference may be. The exact length of the conveying section A—B is relatively unimportant because its primary function is to convey the plastic compound from the charging opening 23 to the point B at the beginning of the working section B—C.

A specific working model of an extruder embodying features of the invention and designed for extruding polyethylene had the following dimensions:

Diameter of the extrusion bore 25=2.00 inches
Length ($l_{ab}$) of the conveying section A—B of the stock screw 30=13.00 inches
Length ($l_{bc}$) of the working section B—C=16.00 inches
Length ($l_{cd}$) of the conditioning tip 80=2.06 inches
Depth ($h_a$) of the helical channel 75 at point A=0.63 inch
Depth ($h_b$) of the helical channel 75 at point B=0.63 inch
Depth ($h_c$) of the helical channel 75 at point C=0.10 inch
Depth of the annular passage 81=0.10 inch
Constant helix angle of single flight 72=17°42′
Width of flight 72=0.25 inch
Pitch length measured along longitudinal axis of the stock screw 30=2.00 inches A specific working model of an extruder embodying features of the invention and designed for extruding polyvinyl chloride has the following dimensions:

Diameter of the extrusion bore 25=2.50 inches
Length ($l_{ab}$) of the conveying section A—B of the stock screw 30=8.75 inches
Length ($l_{bc}$) of the working section B—C=20.00 inches
Length ($l_{cd}$) of the conditioning tip 80=1.59 inches
Depth ($h_a$) of the helical channel 75 at point A=0.565 inch
Depth ($h_b$) of the helical channel 75 at point B=0.565 inch
Depth ($h_c$) of the helical channel 75 at point C=0.075 inch
Depth of the annular passage 81=0.075 inch
Constant helix angle of single flight 72=17°42′
Width of flight 72=0.25 inch
Pitch length measured along longitudinal axis of the stock screw 30=2.50 inches

Operation

To illustrate the operation of the apparatus hereinabove described it will be assumed, for example, that the thermoplastic compound 10 is polyethylene which is to be extruded continuously as a uniform covering 14 upon a continuously advancing conductor 15. The polyethylene is introduced in a variable solid state into the extrusion bore 25 of the extrusion cylinder 20, through the charging opening 23, in the form of solid granules, from the feed hopper 12 wherein the granules are stored at substantially room or ambient temperature.

Thermoplastic material 10 in a solid state may be placed into the hopper 12 of extruder 11 at room temperature and, solely by virtue of the power exerted on the plastic material 10 by the drive of the screw 30, the material 10 is so heated and conditioned that the material 10 is ready for extrusion when it arrives at the exit end of the screw 30. In this way a natural balance is established which is stable and the output of the extruder 11 remains constant. Such conditioning of the plastic material 10 will secure substantially uniform extrusion temperatures throughout a cross section of the helical channel 75 of the stock screw 30, thereby alleviating fluctuations in the output rate of the extruder 11, fluctuations in the consistency of the extruded product, and thermal degradation of the thermoplastic material 10.

If relatively cold compounds 10 are taken from an outdoor storage place in the winter time and fed into the extruder 11, it might be anticipated that this would upset the operation of the extrusion apparatus 11 unless some correctional device is provided. However, this natural balance occurs even though the consistency of the material 10 fed into the extruder 11 varies. Therefore, it should be understood that an unexpected result may be obtained which permits relatively cold plastic material 10 or plastic material 10 with varying consistencies to be fed into the extruder 11 without upsetting the natural balance of the uniform conditioning of the material 10 and delivery rate of the extruder 11. This is accomplished by driving the extrusion screw 30 at a constant speed under the varying load conditions by the variable torque drive motor 31.

Under the above operation, if the screw 30 rotates at the same rate of speed, it must do more work on a colder or stiffer material 10 which is more susceptible to working by the screw 30 as the material 10 is moved from one end of the extrusion cylinder 20 to the other by the screw 30. However, the work done by the screw 30 will be the exact amount required to bring the colder plastic material 10 to the exact condition that the rest of the material 10 has been brought. Conversely, if the material 10 is warmer and softer, and therefore less susceptible to working by the screw 30, the screw 30 rotating at a constant rate, does less work on the softer material 10, as the screw 30 moves the material from one end of the extrusion cylinder to the other, and thus brings the softer material 10 to the same condition for extrusion as the colder and stiffer material 10.

Therefore, it does not matter whether the material 10 is soft or stiff, as long as the speed of rotation of the screw 30 is kept constant the screw 30 will do a little more or a little less work, depending upon the initial condition of the material introduced into the extruder 11. In this manner, only the necessary amount of work will be done to bring about the desired condition of the thermoplastic material 10, and no need exists to provide elaborate heating and cooling means as were found necessary prior to the conception and reduction to practice of the present inventions.

The stock screw 30 is rotated continuously at a constant speed with a variable torque by the motor 31 so that the helical flight 72 provided thereon picks up the granules of polyethylene from the charging opening 23 and conveys them toward the delivery end of the extrusion bore 25. As the granules of polyethylene are advanced along the conveying section A—B, there is substantially no working of the polyethylene taking place, except that the granules are steadily and increasingly compacted into a consolidated mass as they move forward. In effect, the conveying section A—B functions partly as a screw conveyor which feeds the polyethylene continuously to the working section B—C at a rate such that the latter is never starved.

Another function of the conveying section A—B is that of preheating the granules of polyethylene, as the latter are carried along this section to the beginning of the working section B—C. There is a constant flow of heat rearwardly through the extrusion cylinder and stock screw from the warmer portions of the extrusion bore 25, whereat the intense working of the polyethylene takes place. A part of this heat is absorbed by the granules of polyethylene and serves to preheat them for the intense working to which they are subjected in the working zone, in this case the working section B—C. Thus, some of the heat generated by the working of the material in the working section, which otherwise might be wasted, is utilized advantageously.

The vigorous working of the polyethylene commences when the polyethylene reaches the point B, whereupon it is subjected to a working action which takes place as it is rubbed against the wall of the extrusion bore 25, the sides of the flight 72 and the root 70 of the stock screw 30. This vigorous working of the polyethylene generates heat within the polyethylene causing its temperature to rise. As the polyethylene is worked and advanced along the working section B—C, the velocity of its flow increases rapidly at a constant rate of acceleration, due to the fact that the depth ($h_x$) of the channel 75 along this section of the stock screw 30 decreases hyperbolically as described hereinabove.

As the depth of the channel 75 decreases, the working of the polyethylene increases greatly and the polyethylene becomes progressively more plastic as its temperature rises autogenously as a result of the working. When the polyethylene finally reaches the delivery end of the constant acceleration section B—C at the point C, it is in a viscous, fluid state at a temperature of approximately 325° F. or slightly lower, which temperature is substantially less than the temperature required for smooth and uniform extrusion. Further, the polyethylene at this point in its progress through the extrusion bore 25 does not possess the degree of homogeneity required for smooth and uniform extrusion.

The required increase in the temperature of the polyethylene and the required increase in the degree of homogeneity are imparted to the polyethylene as it is forced through the restricted passage 81 surrounding the relatively short conditioning tip 80. The working which takes place on the polyethylene along the length ($l_{cd}$) of the conditioning tip 80 is extremely severe, due to the relatively shallow clearance between its periphery and the wall of the extrusion bore 25. As a result, the temperature of the polyethylene rises very rapidly and the polyethylene reaches a desired optimum extrusion condition, having a temperature of approximately 350° F., or greater, and a high degree of homogeneity, in the relatively short time it takes for the polyethylene to travel the length ($l_{cd}$) along the conditioning tip 80. Since the polyethylene does not reach its optimum extrusion condition until it reaches the discharge end of the conditioning tip 80, there is no unnecessary overworking of the polyethylene and no danger of overheating it.

It has been found that, for a stock screw and a conditioning tip constructed in accordance with the teachings of the invention, there is a minimum rotational speed for autogenous extrusion. Above this minimum speed, the amount of heat generated within the plastic compound 11 by the working action of the stock screw and the conditioning tip is sufficient to achieve the required conditioning thereof to establish the desired optimum condition for smooth and uniform extrusion, without resort to supplemental heating or cooling by external means. For example, assume that the stock screw 30 and the conditioning tip 80 of the extruder are constructed to the specific dimensions set forth hereinabove. When the stock screw 30 is driven rotatably at speeds above approximately 20 r.p.m., a completely autogenous extrusion process is achieved, and no heat must be added to or taken away from the extrusion cylinder by supplemental heating and cooling equipment. The effect of increasing the speed of rotation of the stock screw 30 and the conditioning tip 80 above the minimum speed for autogenous operation, within a relatively wide speed range, has little effect on the extrusion condition of the polyethylene other than a slight increase in its temperature. This may be explained by the fact that as the rotational speed of the screw is increased and the heat generated increased, there is a corresponding increase in the volumetric output rate which serves to carry away the additional heat. Manifestly, there is an upper limit, which, if exceeded, will result in the overheating of the polyethylene. However, it has been found that the upper limit is sufficiently high to permit a wide range of operating speeds above the minimum speed required for autogenous extrusion.

When the extrusion operation is commenced, the speed of the motor 21 is increased until the stock screw 30 and the conditioning tip 80 are rotating at a speed greater than the minimum speed for autogenous extrusion, at which a desired output rate is obtained. Manifestly, the extruder should be dimensioned so that the desired output rate can be obtained without exceeding the upper limit of the speed range within which the extrusion operation is autogenous. Once the desired output rate is achieved the rotational speed of the screw is maintained as nearly constant as possible.

It has been demonstrated that the temperatures of autogenous extruders at various sections thereof are more uniform than the temperatures at corresponding sections of comparable nonautogenous extruders, and that the temperature and condition of the plastic material exiting from the autogenous extruders is more uniform than that exiting from the nonautogenous extruders employing relatively expensive and elaborate heating and cooling devices.

Accordingly, with the extrusion apparatus embodying the present invention, it is possible to make uniform products and eliminate the necessity of providing large tolerances and a corresponding amount of waste of materials which is necessary with commercially available extrusion apparatus utilizing heating and cooling devices, which cause variations in the consistency of the thin layer of plastic material in contact with the portion of the extruder being heated or cooled and, in turn, result in a variation in the size and shape of the extruded article.

It has been demonstrated by utilizing apparatus embodying the present invention, as compared to other non-autogenous extrusion apparatus that measured tolerances along random portions of two million feet of polyethylene-insulated, 19-gauge copper conductor having approximately 0.075 inch outside diameter, when the wire speed was maintained uniform, were of the order of ±0.0001 inch. Whereas, with the nonautogenous extrusion apparatus operating under similar circumstances it is possible to achieve tolerances of approximately ±0.001 inch. This demonstrates that the discovery of the advantages and beneficial results achieved by the autogenous methods and apparatus embodying the principles of the present invention was an important contribution to the extrusion art.

Since the extrusion operation proceeds autogenously and there is no supplemental heating or cooling involved in the process, the deleterious effects of the latter are completely obviated. Thus, the output rate of the extruder is not subject to the fluctuations which would occur if supplemental heating or cooling are employed. The polyethylene which is applied to the continuously advancing conductor 14 forms a smooth sheath of uniform diameter about the conductor.

An additional important feature of this invention is that it is readily adapted to existing extrusion cylinders of various lengths, since the length of the conveying section A—B of the stock screw 30 is not a critical factor. Accordingly, the conveying section A—B of the stock screw 30 may be made any length. For example, let it be assumed that two extrusion cylinders are identical dimensionally, except for the lengths of their respective extrusion bores. Satisfactory operation can be achieved by merely making the conveying section A—B of each stock screw of the correct length to provide a conveying stction extending from the charging opening 23 to the beginning of the working section B—C thereof.

Obviously, the conveying section of the two stock screws will be of different lengths, but the working section B—C and the conditioning tip will have the same lengths in both extrusion cylinders. Nevertheless, in each case, the stock screw and conditioning tip would function effectively to achieve autogenous extrusion. Consequently, when designing a stock screw for autogenous extrusion, the desired working section and conditioning tip will be designed first, and then a conveying section of the length necessary to extend between the charging opening and the beginning of the working section will be designed, regardless of what that length may be. This factor provides great flexibility in the design and use of screws for autogenous extrusion operations because the length of the extrusion cylinder is not such a limiting factor as it is when the design of a screw for conventional extrusion is made.

*Alternate Embodiment*

Figure 5:
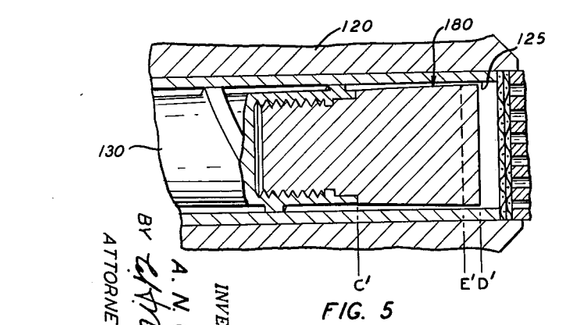
FIG. 5 is an enlarged, fragmentary, horizontal section taken along the longitudinal axis of an extrusion cylinder forming a part of an alternate embodiment of the invention.

Referring now to FIG. 5, there is shown the delivery end portion of an extrusion cylinder 120 forming part of an alternate embodiment of the invention. The extrusion cylinder 120 is identical in construction to that of the extrusion cylinder 20 of the first-described embodiment, and is similarly provided with an extrusion bore 125. A stock screw 130, identical in construction to the stock screw 30 of the first-described embodiment, is rotatably mounted within the extrusion bore 125. Attached threadedly to the delivery end of the stock screw 130 is a conditioning tip 180 having a length ($l_{c'd'}$) which is equal to the length ($l_{cd}$) of the conditioning tip 80.

Figure 6:
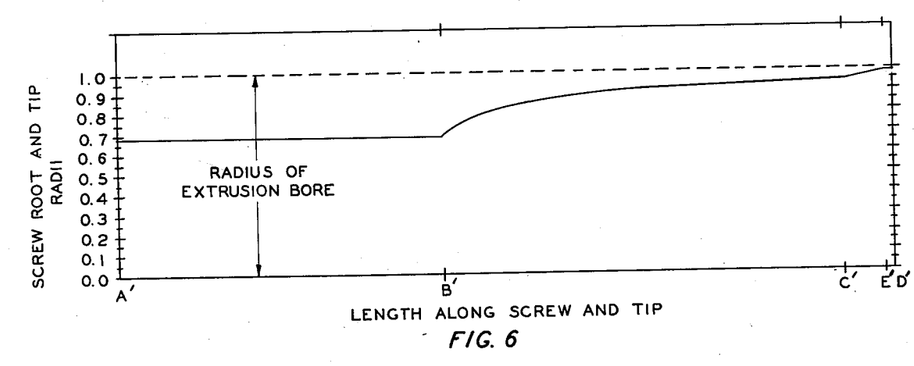
FIG. 6 is a diagram illustrating graphically the variation in the root radii along the longitudinal axes of a stock screw and conditioning tip forming parts of the modified embodiment of the invention.

The conditioning tip 180 is generally frustoconical, except for a very short cylindrical portion extending from a point E' to the point D' at the outer extremity thereof. At the point C' the outer diameter of the conditioning tip 180 is equal to the root diameter of the stock screw 130 at that point. The outer diameter of the conditioning tip 180 increases uniformly from the point C' to the point E' (FIG. 6), the radial clearance at the latter point being extremely small (e.g. approximately 25% of the radial clearance at the point C'). This extremely small radial clearance is maintained constant along the very short remaining portion of the conditioning tip 180 from the point E' to the point D' at the extremity thereof.

*Operation of the Alternate Embodiment*

The operation of the alternate embodiment of the invention is similar to that of the first-described embodiment, except for the relatively greater amount of working to which the thermoplastic compound 10 is subjected as it advances through the more restricted passage 181 between the wall of the bore 125 and the periphery of the conditioning tip 180. Manifestly, if the thermoplastic compound were polyethylene, the final temperature of the polyethylene as discharged from the bore 125 would be somewhat greater than in the case of the first-described embodiment, due to the increase in the intensity of the working imparted thereto.

It may be seen that the alternate embodiment of the invention can be obtained readily, merely by replacing the conditioning tip 80 of the first-described embodiment with the conditioning tip 180. In this respect, the stock screw is to some extent universal, and various thermoplastic materials can be conditioned to their respective optimum conditions for required smooth and uniform extrusion, by merely utilizing suitably designed conditioning tips. The choice of the conditioning tip for a given thermoplastic compound 10 will depend upon the thermal sensitivity of the compound and the amount of working which is required to bring the compound rapidly to its optimum extrusion condition as it advances along the relatively short terminal length ($l_{cd}$) or ($l_{c'd'}$) of the extrusion bore.

In practice, the working model of the extruder heretofore described in connection with the first-described embodiment of the invention was modified by replacing the conditioning tip 80 with a conditioning tip 180 having a length ($l_{c'd'}$) of 2.06 inches and a maximum outer diameter of approximately 1.97 inches at the points E' and D'. The thus modified apparatus was employed to extrude polyvinyl chloride compound and was found to operate autogenously when the stock screw was driven at speeds above approximately 20 r.p.m. and less than approximately 55 r.p.m. The temperature of the polyvinyl chloride compound at the point C' was found to be approximately 345° F. and approximately 390° F. at the point D'. The condition of the compound discharged from the extrusion bore was such as to produce smooth and uniform extrusion thereof.

While the conditioning tips 80 and 180 have been described hereinabove as being preferably unthreaded, they may be provided with threads without changing their action substantially. Further, it is manifest that the conditioning tips 80 and 180 can be formed integrally with the stock screw as a part thereof, rather than being made detachable. For example, the delivery end portion of the working section B—C might be extended to take the place of the conditioning tip 80, since the hyperbolic curve becomes substantially asymptotic.

Although polyethylene and a polyvinyl chloride compound have been used as illustrative examples for the purpose of facilitating a description of the invention, it will be understood that this invention is not limited to use in extruding these plastic compounds. The latter are merely representative of thermoplastic compounds in general, to which the principles of the invention are equally applicable.

By the term "autogenous," as used in the specification and the appended claims, it is meant that all of the heat required to condition the thermoplastic compound is derived from the mechanical energy expended by the stock screw and the conditioning tip in working the compound, and in which no supplemental heating and cooling are involved. Accordingly, in an autogenous extrusion process there is no heating and cooling equipment employed.

While the above-described apparatus are particularly well suited for carrying out autogenous extrusion processes, it will be understood that they are merely exemplary embodiments of the principles of the invention. Manifestly, the salient features of the invention may be embodied in various types of apparatus and processes without departing from the spirit and scope of the invention.

What is claimed is:

1. The method of insulating a core by extruding a thermoplastic compound onto an advancing conductive core, which comprises advancing a conductive core through an extrusion process at a uniform rate, supplying particles of thermoplastic compound in a solid state to the process at ambient temperatures, advancing the thermoplastic compound along a working zone by driving a screw at a uniform rate with a variable torque simultaneously working the thermoplastic compound mechanically with sufficient intensity to bring the thermoplastic compound to a plastic condition required for smooth and uniform extrusion thereof, the conditioning of the thermoplastic compound for smooth and uniform extrusion being effected autogenously solely by the mechanical energy imparted to the thermoplastic compound during the working thereof which prevents the necessity for transferring heat to or from the thermoplastic compound by external means during the processing thereof, and discharging the thermoplastic compound from the process at a uniform temperature, volumetric rate and consistency while simultaneously shaping the compound uniformly on the advancing conductive core into a predetermined shaped sheath having uniform properties throughout the cross section thereof and relatively small variations in the diameter thereof of less than ±0.0001 inch.

2. The method of extruding thermoplastic compounds possessing a natural balance which is substantially stable and permits thermoplastic compounds in a solid state of variable consistencies to be supplied and conditioned without upsetting the natural balance of the uniform conditioning of the material and still cause the output of the extrusion process to remain at an unexpected substantially constant rate so that the flow of the thermoplastic compound is smooth and free from quantitative variations which reduces deviations in the size and quality of the extruded product produced thereby and reduces the cost thereof, which comprises passing a core through an extrusion process at a uniform velocity, supplying thermoplastic compound in a solid state of variable consistencies to the process, advancing the thermoplastic compound along a working zone at a uniform rate by driving a screw at a constant angular velocity with a variable torque, simultaneously autogenously working the compound under varying load conditions with sufficient intensity to bring the thermoplastic compound to a viscous fluid condition required for smooth and uniform extrusion thereof, all of the necessary heat for conditioning the thermoplastic compound being generated solely through the expenditure of mechanical energy imparted to the thermoplastic compound during the working of the thermoplastic compound while being advanced through the working zone at a uniform rate which prevents the necessity for heat being added to or removed from the thermoplastic compound during the passage of the compound through the working zone, and shaping the thus-conditioned thermoplastic compound into a covering on the advancing core to produce a finished product of a predetermined size and shape and having relatively small variations in the outside dimensions thereof of the order of ±0.0001 inch.

3. The method of forming an insulated conductor by extruding a thermoplastic compound onto an advancing conductive core, which comprises advancing an initially solid thermoplastic compound along a working zone by rotating a screw at a uniform rate with a variable torque, simultaneously working the thermoplastic compound mechanically with sufficient intensity to bring the thermoplastic compound to a viscous fluid condition required for smooth and uniform extrusion thereof, the conditioning of the thermoplastic compound for smooth and uniform extrusion being effected autogenously solely by the mechanical energy imparted to said thermoplastic compound during the working thereof which prevents the necessity for adding heat to or removing heat from the thermoplastic compound by any external means, and then simultaneously shaping the conditioned compound uniformly into a predetermined shape on the conductive core and simultaneously discharging successive portions of the thermoplastic compound and covered core through an extrusion orifice to form an insulated conductor having uniform condition throughout the cross section thereof and relatively small variations in the diameter thereof.

4. The method of forming an insulated conductor by extruding a thermoplastic compound onto an advancing conductive core, which comprises advancing an initially solid thermoplastic compound along a working zone by rotating a screw at a uniform rate with a variable torque, simultaneously working the thermoplastic compound mechanically with sufficient intensity to bring the thermoplastic compound to a viscous fluid condition required for smooth and uniform extrusion thereof, the conditioning of the thermoplastic compound for smooth and uniform extrusion being effected autogenously solely by mechanical energy imparted to the thermoplastic compound during the working thereof which prevents the necessity for adding heat to or removing heat from the thermoplastic compound by any external means, and then simultaneously shaping the compound uniformly into a predetermined shape on the conductive core and discharging successive portions of the thermoplastic compound and covered core through an extrusion orifice to form an insulated conductor having uniform electrical characteristics along the length and throughout the cross section thereof and having relatively small variations in the diameter over the insulation of less than ±0.0001 inch.

5. A method of conditioning thermoplastic material and shaping the thermoplastic material onto a conductive core being advanced at a predetermined rate, which comprises supplying particles of plastic material of variable consistencies, advancing the conductive core at a predetermined speed, advancing the thermoplastic material along a working zone by driving a screw at a uniform rate, simultaneously autogeneously working the material with sufficient intensity to bring the thermoplastic material to a viscous fluid conditions required for smooth and uniform extrusion thereof solely by mechanical energy imparted to the thermoplastic material during the working thereof, which prevents the necessity for adding heat to the thermoplastic material from any external source or removing heat from the thermoplastic material by any external media during the processing thereof, causing more work to be done on colder and stiffer material, which is more susceptible to working and causing less work to be done on warmer and softer material, which is less susceptible to working by varying the torque applied to the screw and maintaining the rotational speed of the screw constant, the cooler and stiffer material being brought to the same condition for extrusion as the warmer and softer material, and shaping the thermoplastic material uniformly into a predetermined shape on the continuously advancing conductive core to form an insulating sheath of a predetermined size and shape thereon having uniform physical, mechanical, electrical and visual characteristics at all points along the insulated conductor with narrow limits of tolerances.

6. The method of extruding a thermoplastic compound onto a continuously advancing conductive core, which comprises passing a conductive core through an extrusion process at a predetermined uniform rate, feeding a thermoplastic compound in a solid state to the interior of a cylindrical extrusion chamber provided with a rotating extrusion stock screw, conveying the compound without materially working it along an initial portion of the chamber through a relatively deep radial clearance between the root of the screw and the wall of the chamber to an intermediate portion of the chamber, then working the compound with increasing intensity and simultaneously accelerating the advancement of the compound along the intermediate portion of the chamber at a substantially uniform rate to a terminal portion thereof through a radial clearance between the root of the stock screw and the wall of the chamber which decreases hyperbolically in the direction of the advance of the compound until the clearance is relatively shallow at the terminal portion, transferring continuously a part of the heat from the compound in the intermediate and terminal portion to preheat the compound being conveyed along the initial portion, subsequently working the compound along the terminal portion in which the radial clearance between the root of the stock screw and the wall of the chamber is relatively shallow, all of the necessary heat for conditioning the thermoplastic compound being generated solely through the expenditure of mechanical energy imparted to the thermoplastic compound during the working of the thermoplastic compound which prevents the necessity for transferring heat to and from the thermoplastic compound by external means during the passage of the compound through the extrusion chamber, rotating the stock screw throughout the operation at a uniform speed with a variable torque so that the conditioning of the compound is effected autogeneously solely by the mechanical energy imparted by the rotating screw to the compound in the course of the working thereof, and discharging the thermoplastic compound from the process at a uniform temperature, volumetric rate of consistency while simultaneously shaping the compound uniformly upon the advancing conductive core to form an insulating sheath of a predetermined shape and having uniform properties throughout the cross section thereof and relatively small variations in the diameter thereof of less than ±0.0001 inch.

7. Extrusion apparatus for coating an indefinite length of material possessing a natural balance permitting solid particles of thermoplastic compounds of varying consistencies to be fed to the apparatus without upsetting the natural balance of the uniform conditioning of the compound, and yet causing the output of the extrusion apparatus to remain at an unexpected substantially constant rate, which comprises means for advancing an indefinite length of material to be coated through the apparatus at a predetermined speed, an extrusion cylinder having an extrusion chamber formed therein, screw means mounted rotatably in the extrusion chamber and having a helical flight forming a spiral groove thereon which decreases in cross-sectional area from one end thereof to the other for advancing an initially solid thermoplastic compound along the chamber and for simultaneously autogeneously working the compound with sufficient intensity to bring the thermoplastic compound to a viscous fluid condition required for smooth and uniform extrusion thereof solely by the mechanical energy imparted to the thermoplastic compound during the working thereof, means for insulating the cylinder for preventing transfer of heat to or from the compound externally thereof, means for rotating the screw means at a constant speed under variable load conditions with a variable torque, means for shaping the thus-conditioned thermoplastic compound into a tubular sheath on the indefinite length of material having relatively small variations in the diameter of the sheath of the order of ±0.0001 inch.

8. Extrusion apparatus possessing a natural balance which is substantially stable and permits thermoplastic compounds of varying consistencies to be fed to the apparatus without upsetting the natural balance of the uniform conditioning of the materials and still cause the output of the extrusion apparatus to remain at an unexpected substantially constant rate, which comprises an extrusion cylinder having an extrusion chamber formed therein, an extrusion screw mounted rotatably in the extrusion chamber and having a helical flight forming a spiral groove thereon which decreases in cross-sectional area from one end thereof to the other for advancing an initially solid thermoplastic compound along the chamber and for simultaneously working the compound autogeneously with sufficient intensity to bring the thermoplastic compound to a viscous fluid condition required for smooth and uniform extrusion thereof solely by the mechanical energy imparted to the thermoplastic compound during the working thereof, means for rotating the extrusion screw at a constant speed under variable load conditions which prevents the necessity for heat being transferred to or from the thermoplastic material by external means, and means for applying the thus-conditioned thermoplastic compound onto a core advancing through the apparatus at a uniform rate and simultaneously shaping the thermoplastic compound covered core into a finished product of a predetermined shape and having relatively small variation in the outside dimensions thereof of the order of ±0.0001 inch.

9. Apparatus for conditioning thermoplastic material and shaping the thermoplastic material onto a conductive core being advanced through the apparatus at a predetermined rate, which comprises an extrusion cylinder having an extrusion chamber formed therein, means for feeding solid particles of plastic material of variable consistencies to an entrance end of the extrusion chamber, an extrusion head secured to an exit end of the cylinder and communicating therewith, means for advancing the conductive core through the extrusion head, an extrusion screw having a helical flight thereon mounted rotatably in the extrusion chamber for advancing the initially solid thermoplastic material along the chamber and for simultaneously working the material autogenously with sufficient intensity to bring the thermoplastic material to a viscous fluid condition required for smooth and uniform extrusion thereof solely by the mechanical energy imparted to the thermoplastic material during the working thereof without external aid in the form of heating or cooling means, a variable torque drive means for driving the screw at a constant speed under varying load conditions causing more work to be done on colder and stiffer material, which is more susceptible to working by the screw, as the material is moved from one end of the extrusion cylinder to the other by the screw and causing less work to be done on warmer and softer material, which is less susceptible to working by the screw, as the softer material is removed from one end of the cylinder to the other, which eliminates entirely any need for external heating and cooling means and providing a natural balance which is stable, and means forming a portion of the extrusion head for uniformly shaping the thermoplastic material into a predetermined shape on the continuously moving conductive core to form an insulating sheath thereon having uniform physical, mechanical, electrical and visual characteristics at all points along the insulated conductor within narrow limits of tolerances.

10. Apparatus for extruding thermoplastic compounds onto a continuously advancing conductive core, which comprises an extrusion cylinder having an elongated cylindrical bore formed therein, an extrusion stock screw mounted rotatably within the bore, said stock screw fitting closely within the bore and having a helical channel extending substantially from one end to the other end of the screw for advancing an initially solid thermoplastic compound along the chamber and for simultaneously autogenously working the compound with sufficient intensity to bring the thermoplastic compound to a viscous fluid condition required for smooth and uniform extrusion thereof solely by the mechanical energy imparted to the thermoplastic compound during the working thereof, said stock screw including a conveying and compacting section coextensive with an initial portion of the bore, the root diameter of the screw along the conveying and compacting section thereof being relatively small, a constant acceleration section coextensive with the intermediate portion, the depth of the channel along the intermediate portion of the bore decreasing substantially hyperbolically according to the equation:

$$h_x = \frac{1}{\left[\dfrac{\dfrac{1}{h_c} - \dfrac{1}{h_b}}{l_{bc}}\right] X + \dfrac{1}{h_b}}$$

where:

$X$ = the distance along the screw axis from the beginning of the hyperbolically tapered portion,
$h_x$ = the depth of the channel at any point (X) along the hyperbolically tapered portion,
$h_b$ = the depth of the channel at the beginning of the hyperbolically tapered portion,
$h_c$ = the depth of the channel at the end of the hyperbolically tapered portion,
$l_{bc}$ = the length of the hyperbolically tapered portion, and a relatively short conditioning tip secured detachably to the delivery end of the constant acceleration section of the stock screw, said conditioning tip having a minimum outer diameter at least equal to the maximum root diameter of the stock screw, said last-mentioned diameter being relatively large so that there is relatively little radial clearance between the periphery of the conditioning tip and the wall of the extrusion bore whereby the compound is worked severely along the terminal portion of the bore to bring the compound rapidly to a condition required for smooth and uniform extrusion thereof, means insulating the cylinder for preventing transfer of heat to or from the compound externally thereof, means for rotating the screw means at a constant speed under variable load conditions with a variable torque so that the thermoplastic compound will be heated and conditioned autogenously uniformly solely by virtue of power exerted thereon by the drive of the screw thereby eliminating entirely the need for any external heating and cooling of the compound during the working of the thermoplastic compound as the compound is advanced through the extrusion cylinder, and means for shaping the thus-conditioned thermoplastic compound into a cylindrically shaped tubular sheath on the advancing conductive core having relatively small variations in the diameter thereof of the order of ±0.0001 inch.

References Cited in the file of this patent

UNITED STATES PATENTS

| | | |
|---|---|---|
| 1,608,980 | Gordon | Nov. 30, 1926 |
| 2,535,286 | Henning | Dec. 26, 1950 |
| 2,547,000 | Gray | Apr. 3, 1951 |
| 2,631,016 | Kraffe de Laubarede | Mar. 10, 1953 |
| 2,653,915 | Elgin et al. | Sept. 29, 1953 |
| 2,688,770 | Henning | Sept. 14, 1954 |